United States Patent
DePue et al.

(10) Patent No.: US 7,140,636 B2
(45) Date of Patent: Nov. 28, 2006

(54) AIRBAG SUPPORT ASSEMBLY FOR A VEHICLE INSTRUMENT PANEL

(75) Inventors: Todd DePue, Brighton, MI (US); Glenn A. Cowelchuk, Chesterfield Township, MI (US); Michael J. Hier, Milford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/431,211

(22) Filed: May 7, 2003

(65) Prior Publication Data

US 2004/0232668 A1 Nov. 25, 2004

(51) Int. Cl.
*B60R 21/16* (2006.01)

(52) U.S. Cl. ...................................... 280/732

(58) Field of Classification Search ................ 280/732, 280/728.3, 728.1, 728.2
See application file for complete search history.

(56) References Cited

U.S. PATENT DOCUMENTS

| | | | |
|---|---|---|---|
| 4,714,575 A | 12/1987 | Preston | |
| 5,225,214 A | 7/1993 | Filion | |
| 5,304,273 A | 4/1994 | Kenrick et al. | |
| 5,316,715 A | 5/1994 | Gray | |
| 5,346,249 A | 9/1994 | Hallard et al. | |
| 5,348,339 A | 9/1994 | Turner | |
| 5,393,089 A | 2/1995 | Pakulsky et al. | |
| 5,427,408 A | 6/1995 | Ando et al. | |
| 5,456,490 A | 10/1995 | Carter et al. | |
| 5,501,890 A * | 3/1996 | Mills | 428/68 |
| 5,564,731 A | 10/1996 | Gallagher et al. | |
| 5,590,901 A * | 1/1997 | MacGregor | 280/728.3 |
| 5,611,564 A | 3/1997 | Bauer | |
| 5,622,402 A | 4/1997 | Pritchard et al. | |
| 5,639,115 A | 6/1997 | Kelley et al. | |
| 5,738,367 A | 4/1998 | Zichichi et al. | |
| 5,744,776 A | 4/1998 | Bauer | |
| 5,794,967 A | 8/1998 | Manire | |
| 5,803,487 A * | 9/1998 | Kikuchi et al. | 280/728.2 |
| 5,975,562 A | 11/1999 | Yamamoto et al. | |
| 5,975,563 A | 11/1999 | Gallagher et al. | |
| 5,979,931 A | 11/1999 | Totani et al. | |
| 5,997,030 A | 12/1999 | Hannert et al. | |
| 6,076,851 A | 6/2000 | Davis, Jr. et al. | |
| 6,089,642 A | 7/2000 | Davis, Jr. et al. | |
| 6,092,835 A | 7/2000 | Thakore et al. | |
| 6,093,272 A | 7/2000 | Visconti et al. | |
| 6,095,272 A | 8/2000 | Takiguchi et al. | |
| 6,145,871 A | 11/2000 | Davis, Jr. et al. | |
| 6,203,056 B1 * | 3/2001 | Labrie et al. | 280/728.3 |
| 6,210,614 B1 | 4/2001 | Gardner et al. | |
| 6,217,098 B1 | 4/2001 | O'Brien et al. | |
| 6,250,669 B1 | 6/2001 | Ohmiya | |
| 6,440,514 B1 | 8/2002 | Ueno et al. | |

(Continued)

*Primary Examiner*—Faye M. Fleming
(74) *Attorney, Agent, or Firm*—MacMillan, Sobanski & Todd, LLC

(57) ABSTRACT

An interior vehicle trim panel includes a panel body having a front face and an under face. The under face has a tear seam to allow an airbag to exit the panel body when the airbag is deployed. The tear seam defines an airbag door. A sheet of hinge material attached to the under face of the airbag door of the panel body. An airbag collar is attached to the under face of the panel body about the airbag door. An airbag housing is attached to the airbag collar, such that a portion of the sheet of hinge material is secured between the airbag collar and the airbag housing, thereby forming an interior vehicle trim panel.

20 Claims, 4 Drawing Sheets

U.S. PATENT DOCUMENTS

| | | |
|---|---|---|
| 6,460,880 B1 | 10/2002 | Gallagher et al. |
| 6,533,312 B1 * | 3/2003 | Labrie et al. ............ 280/728.2 |
| 6,595,543 B1 * | 7/2003 | Desprez ................... 280/728.3 |
| 6,644,685 B1 * | 11/2003 | Sun et al. ................ 280/728.3 |
| 6,742,804 B1 * | 6/2004 | Suzuki et al. ............ 280/728.3 |
| 6,753,057 B1 * | 6/2004 | Gardner, Jr. ................ 428/43 |
| 6,857,654 B1 * | 2/2005 | Choi et al. ............... 280/728.2 |
| 6,929,280 B1 * | 8/2005 | Yasuda et al. ........... 280/728.2 |
| 2002/0043788 A1 | 4/2002 | Gallagher et al. |
| 2002/0079675 A1 | 6/2002 | Taoka et al. |
| 2002/0153741 A1 | 10/2002 | Speelman et al. |
| 2003/0020263 A1 | 1/2003 | Preisler |
| 2004/0026902 A1 * | 2/2004 | Yasuda et al. ........... 280/728.2 |

* cited by examiner

AIRBAG SUPPORT ASSEMBLY FOR A VEHICLE INSTRUMENT PANEL

TECHNICAL FIELD

This invention relates to interior vehicle trim panels. More particularly, the invention relates to an interior vehicle trim panel having an improved airbag support assembly for a vehicle airbag.

BACKGROUND OF THE INVENTION

Incorporation of airbags into vehicles has created many design challenges for automotive designers. It is desirable to incorporate an airbag into an instrument panel in front of the vehicle passenger seat. When incorporating an airbag into an instrument panel it is necessary to provide an airbag cover portion in the instrument panel that will reliably and safely tear, such that the passenger is protected. To this end, a tear seam has generally been provided in the airbag cover portion of an instrument panel to insure that the airbag will safely deploy.

Vehicle designers prefer to have a continuous surface on the front face of the instrument panel whenever possible, so they would prefer to avoid having a tear seam in the instrument panel. Thus, recently there has been an effort to achieve a "seamless" design wherein there is no indication on the front face of the instrument panel that the airbag is behind the instrument panel. To achieve this design, tear seams or tear strips provided in the instrument panel are only provided on the under face, and not on the front face of the instrument panel.

The instrument panel must perform the utilitarian function of breaking apart along its tear seam to allow the air bag to exit through the airbag cover portion of the instrument panel when deployed. Additionally, the airbag cover portion of the instrument panel must not break apart, especially during cold deployment, so as to present projectile(s) which may injure an occupant of the motor vehicle.

Thus, it is desirable to provide an improved airbag support assembly for an airbag. Preferably, such an improved airbag support assembly would permit a reduction in the occurrence of undesirable projectiles during deployment of the airbag.

SUMMARY OF THE INVENTION

This invention relates to an interior vehicle trim panel. The trim panel includes a panel body having a front face and an under face. The under face has a tear seam to allow an airbag to exit the panel body when the airbag is deployed. The tear seam defines an airbag door. A sheet of hinge material attached to the under face of the airbag door of the panel body. An airbag collar is attached to the under face of the panel body about the airbag door. An airbag housing is attached to the airbag collar, such that a portion of the sheet of hinge material is secured between the airbag collar and the airbag housing, thereby forming an interior vehicle trim panel.

In one embodiment of the invention, the airbag collar includes a front face and an under face. The front face includes a plurality of outwardly extending and concentrically arranged weld beads for attaching the front face of said airbag collar to the under face of the panel body. Preferably, the airbag collar is attached to the panel body by a vibration weld.

In an alternate embodiment of the invention, the sheet of hinge material includes a scrim integrally formed therein. Preferably, the sheet of hinge material and the scrim are formed by extrusion.

Various objects and advantages of this invention will become apparent to those skilled in the art from the following detailed description of the preferred embodiment, when read in light of the accompanying drawings.

DETAILED DESCRIPTION OF THE INVENTION

Figure 1:
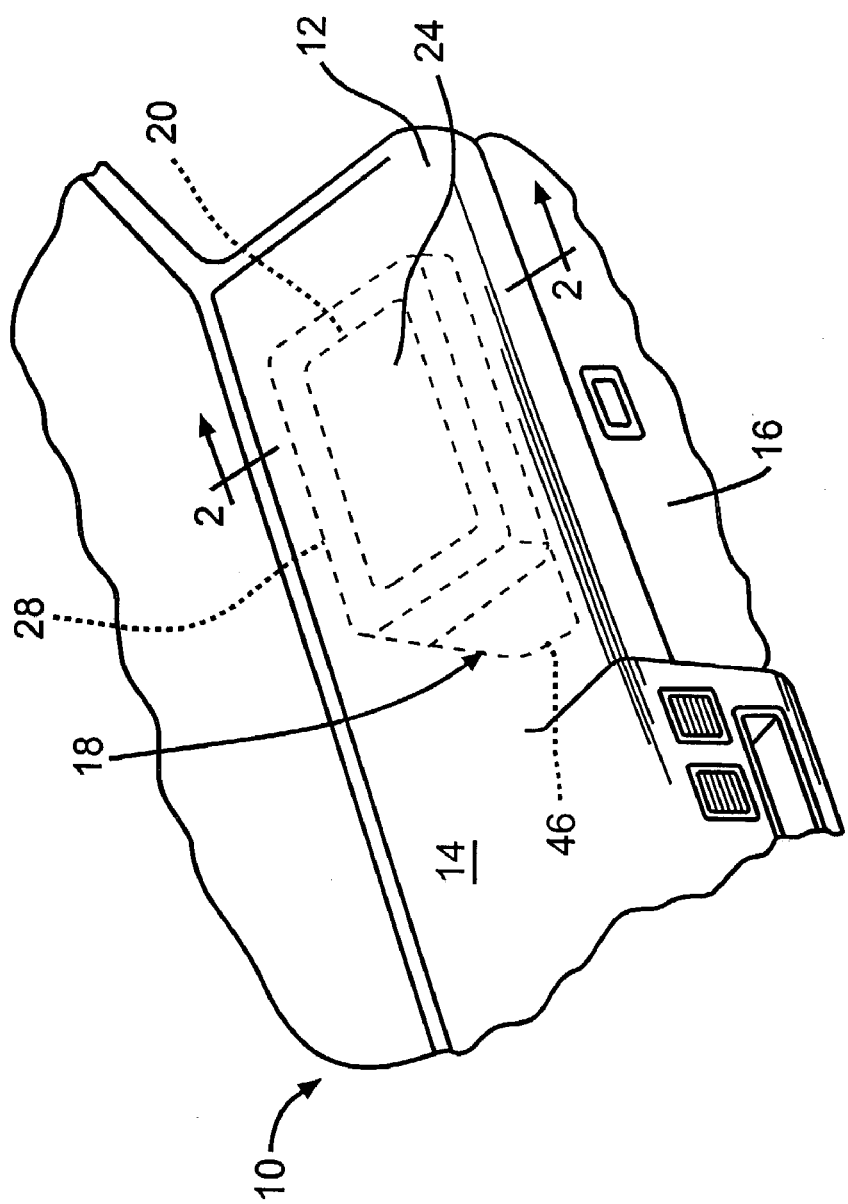
FIG. 1 is a partial perspective view of an instrument panel manufactured according to the invention.

Referring now to the drawings, there is illustrated in FIG. 1, an instrument panel, indicated generally at 10. The instrument panel 10 is an example of a trim panel for mounting in an interior cabin of a vehicle. It will be appreciated however, that the trim panel 10 of the subject invention may be any type of trim panel associated with a vehicle. Other suitable examples of trim panels include door panels, center consoles, overhead consoles, and other various interior panels for covering the sides, ceilings, and/or vertical pillars of the frame members of the vehicle.

The instrument panel 10 is installed on a vehicle frame generally in the area underneath the windshield and between the engine compartment and the interior of the vehicle. The instrument panel 10 can include any suitable frame structure (not shown) for supporting the instrument panel 10 to the vehicle frame. The portion of the exemplary instrument panel 10 illustrated in FIG. 1 includes an instrument panel body 12 having a show or front face 14 and a glove box 16. Since the front face 14 of the instrument panel 10 are within reach and direct sight of the occupants of the vehicle, it is desirable for this portion of the instrument panel 10 to be aesthetically pleasing in color and texture.

Figure 2:
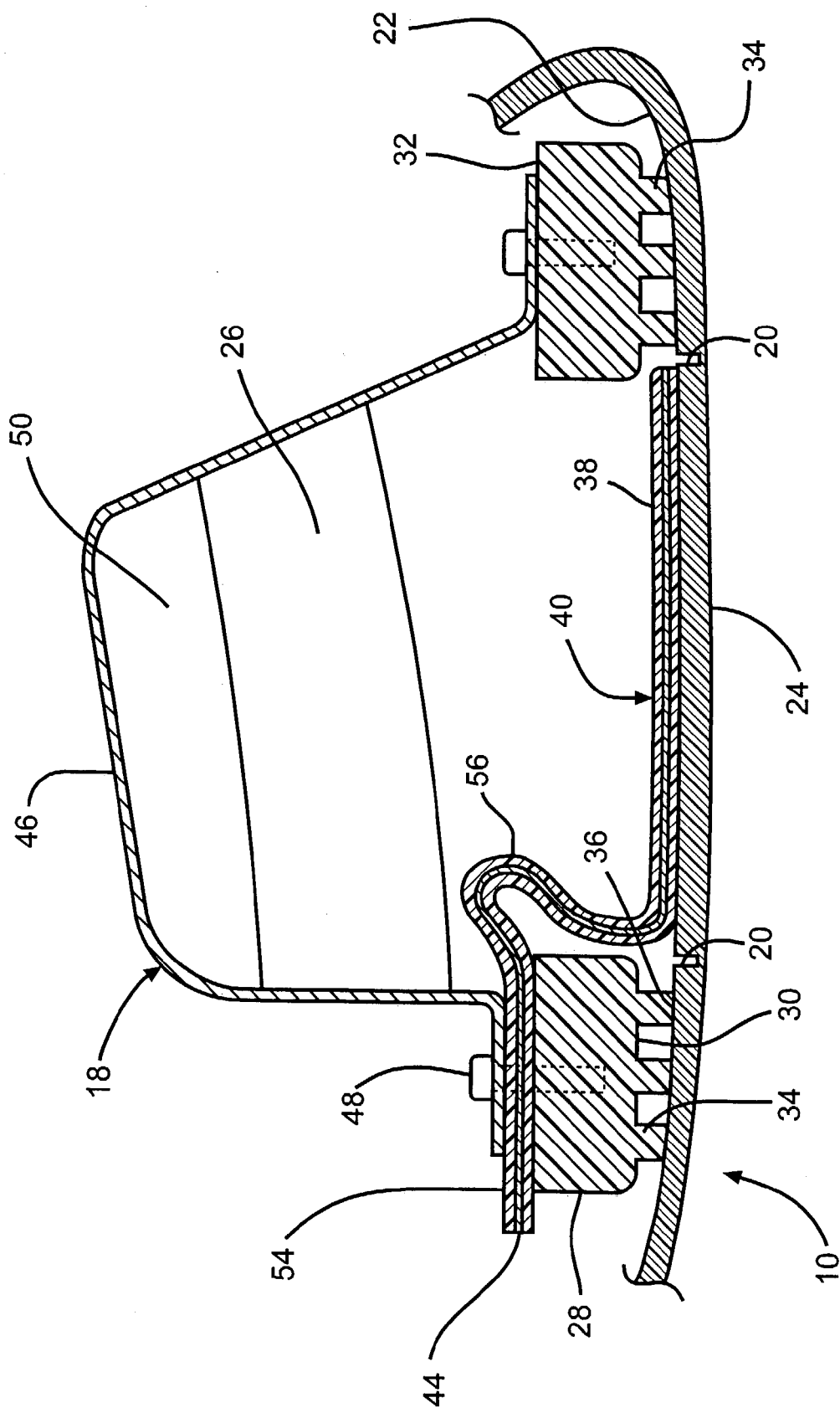
FIG. 2 is a cross-sectional view of a portion of the instrument panel taken along line 2—2 of FIG. 1, showing the airbag door, the collar, the hinge material, and the airbag support assembly.
Figure 3:
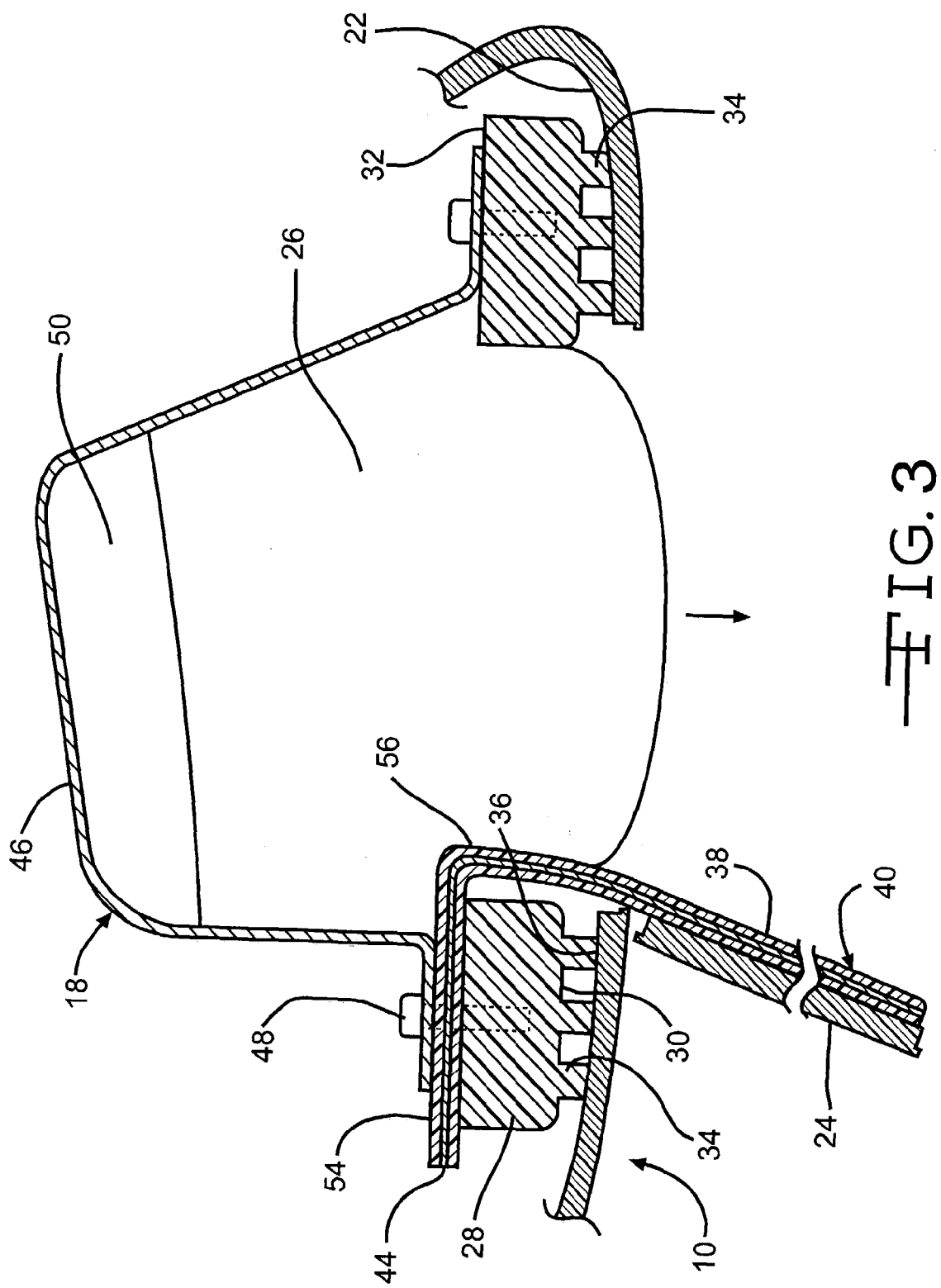
FIG. 3 is a cross-sectional view of the airbag door, the collar, the hinge material, and the airbag support assembly illustrated in FIG. 2, showing the airbag door in the deployed position.

Shown in phantom outline in FIG. 1 is an airbag support assembly 18 located behind the front face 14, and a tear seam 20 formed in an under face 22, as best shown in FIG. 2, of the panel body 12. Preferably, the tear seam 20 defines an airbag door 24. It will be appreciated that the tear seam 20 can be any weakened area of the instrument panel 10, such that an airbag 26, as shown in FIGS. 2 and 3, can exit the panel body 12 when the airbag 26 is deployed, for example, during a vehicle collision.

As shown in FIG. 1, the tear seam 20 has a substantially rectangular shape. However, it will be appreciated that the tear seam 20 can be of any desired shape, such as U-shaped, or H-shaped. The tear seam 20 can be formed by any desired method. Preferably, the tear seam 20 is formed by laser scoring.

The instrument panel 10 is preferably made of a relatively rigid material. Preferably, the instrument panel 10 is made of a polymer or plastic material. Examples of suitable materials for the instrument panel 10 include thermoplastic elastomer, thermoplastic elastomer polyolefin, polycarbonate, polypropylene, ABS (acrylonitrile butadiene styrene), polycarbonate ABS, SMA (styrene maleic anhydride), polyphenylene oxide (PPO), nylon, polyester, acrylic, and polysulfone. More preferably, the instrument panel 10 is formed of a molded plastic material, such as thermoplastic olefin (TPO). However, it will be appreciated that the instrument panel 10 can be formed of any other desired material. The instrument panel 10 can also have any suitable textured surface and color.

Various covers and panels (not shown) may be attached to the instrument panel 10 to cover exposed positions thereof. For example, an aesthetically pleasing trim panel, such as a faux wood or carbon fiber panel (not shown) may be used to cover a portion of the instrument panel 10. Other components, such as vent covers, display devices, electronic controls, audio/video entertainment units, and the like may be attached to the instrument panel 10. Alternately, all portions of the instrument panel 10 may be covered and not seen from within the interior of the vehicle.

As best shown in FIG. 2, the airbag support assembly 18 is secured to the under face 22 of the panel body 12. The airbag support assembly 18 includes an airbag collar 28. The airbag collar 28 is attached to the under face 22 of the panel body 12 about the tear seam 20.

Figure 4:
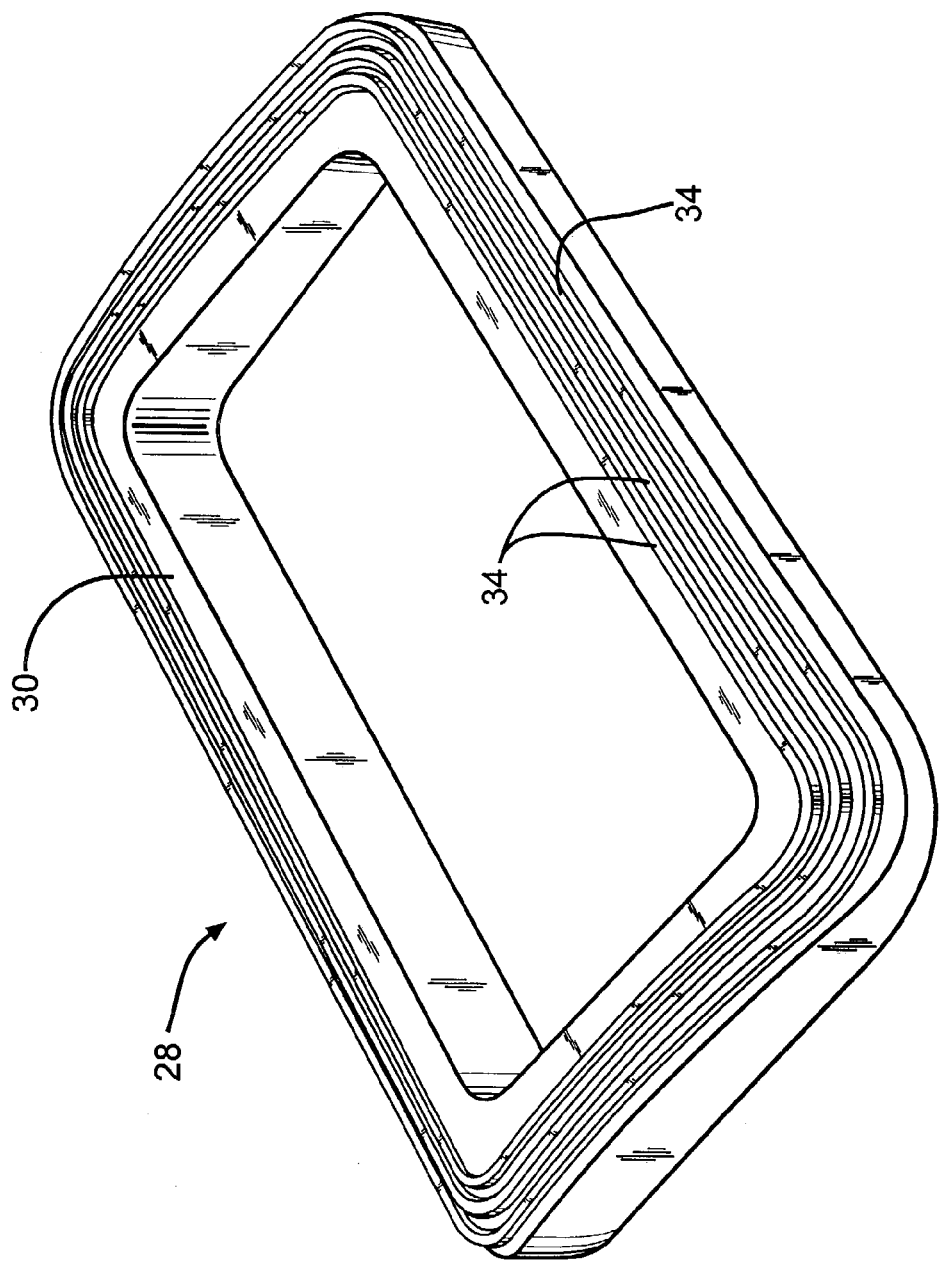
FIG. 4 is a perspective view of the airbag collar illustrated in FIGS. 3 and 4, showing the weld beads.

As shown in FIG. 4, the airbag collar 28 of the exemplary embodiment is substantially rectangular in shape, and includes a front face 30 and an under face 32. It will be appreciated however, that the collar 28 of the subject invention can be of any other desired shape, such as round or oval. The collar 28 is preferably formed of a molded plastic material, such as TPO. However, it will be appreciated that the collar 28 can be formed of any other desired material.

The front face 30 of the collar 28 includes a plurality of outwardly extending and concentrically arranged weld beads 34 for attaching the front face 30 of the collar 28 to the under face 22 of the panel body 12. Preferably, the collar 28 is attached to the panel body 12 by welds 36 formed between the weld beads 34 and the panel body 12 by vibration welding. It will be appreciated however, that the collar 28 can be attached to the panel body 12 by any other desired attachment means. It will be further appreciated that although three weld beads 34 are illustrated, any desired number of weld beads 34 can be formed on the front face 30 of the collar 28.

Advantageously, it has been discovered that when the collar 28 has been vibration welded to the panel body 12, substantially no failure of the vibration welds 36 occur when the airbag 26 is caused to deploy in either very hot or very cold temperatures. As used herein, very cold is defined as about −40° C., and very hot is defined as about 85° C.

The vibration weld provides a very strong connection between the airbag collar 28 and the instrument panel body 12. This strong connection further enables the airbag collar 28 to contain the forces generated during deployment of the airbag 26, thereby substantially reducing the occurrence of cracking of the instrument panel 10, especially during extreme cold temperature conditions. Such substantial reduction of cracking thereby also substantially reduces the occurrence of undesirable projectiles during deployment of the airbag 26.

A portion 38 of a sheet of hinge material 40 is attached to an under face of the airbag door 24. The hinge material 40 can be attached to the airbag door 24 by any desired method. Preferably, the hinge material 40 is attached to the airbag door 24 by vibration welding. The vibration weld provides a very strong connection between the sheet of hinge material 40 and the airbag door 24. Preferably, the hinge material 40 is attached to substantially the entire airbag door 24, such that the hinge material 40 substantially covers substantially all of the under face 22 within the tear seam 20, as shown in FIG. 2. It will be understood that "substantially all of the under face 22" is defined herein as within the range of from about 80 percent to about 100 percent of the under face 22 within the tear seam 20. The sheet of hinge material 40 is preferably formed of a relatively flexible material. More preferably, the hinge material 40 is formed of thermoplastic elastomer (TPE).

The sheet of hinge material 40 preferably includes a scrim 44 attached thereto. Such a scrim 44 provides increased tensile strength to the sheet of hinge material 40. Preferably, the scrim 44 is embedded within the sheet of hinge material 40 by any desired method, such as insert molding, compression molding, two-shot molding, and the like. More preferably, the scrim 44 is embedded within the sheet of hinge material 40 during an extrusion process, as is known to one skilled in the art. The scrim 44 can be formed from any desired material, such as polyester or nylon.

An airbag housing 46 is attached to the airbag collar 28. Preferably, the airbag housing 46 is attached to the collar 28 with threaded fasteners 48. However, threaded fasteners 48 are not required, and the airbag housing 46 can be attached to the collar 28 by any desired attachment means. The airbag housing 46 preferably includes an airbag inflator 50 and an airbag 26. The airbag inflator 50 and the airbag 26 are shown schematically for illustration purposes since they are known in the art and their construction forms no part of the invention. As will be understood by one of ordinary skill in the art, the shape of the airbag housing 46, airbag inflator 50, and airbag 26 may vary from that shown.

The sheet of hinge material 40 includes a free end 54 opposite the portion 38 which is attached to the under face of the airbag door 24. The sheet of hinge material 40 further defines a hinge member 56 intermediate the free end 54 and the attached portion 38, as shown in FIGS. 2 and 4. Preferably, the free end 54 of the hinge material is secured between the under face 32 of the collar 28 and the airbag housing 46. However, it will be appreciated that the free end 54 of the hinge material 40 can be secured to any portion of the airbag support assembly 18 or to any portion of the panel body 12.

When the airbag 26 deploys it will initially be forced against the under face 22 of the airbag door 24. As shown in FIG. 3, the airbag 26 then ruptures the instrument panel body 12 along the tear seam 20 such that the airbag door 24 (the portion of the instrument panel body 12 within the outline of the tear seam 20) separates from the rest of the instrument panel body 12 and moves outward of the instrument panel 10. The hinge member 56 permits the airbag door 24 to rotate outwardly so that the airbag 26 can be released into the passenger compartment of the vehicle. During and after deployment of the airbag 26 the airbag door 24 remains attached to the panel body 12 by the hinge member 56 of the sheet of hinge material 40.

The principle and mode of operation of this invention have been described in its preferred embodiments. However, it should be noted that this invention may be practiced otherwise than as specifically illustrated and described without departing from its scope.

What is claimed is:

1. An interior vehicle trim panel comprising:
a panel body having a tear seam to allow an airbag to exit said panel body when the airbag is deployed, said tear seam defining a door;
a hinge connected to said airbag door and said panel body; and
a collar welded to said panel body and surrounding said tear seam, said collar being separate from said panel body and said hinge, wherein said collar includes a plurality of outwardly extending weld beads welded to said panel body.

2. The trim panel of claim 1, wherein said collar completely surrounds said tear seam.

3. The trim panel of claim 2, wherein at least one of said plurality of weld beads extends continuously around said tear seam.

4. The trim panel of claim 3, wherein said plurality of outwardly extended weld beads are concentrically arranged relative to one another.

5. The trim panel of claim 1 further including an airbag housing attached to said collar, wherein a portion of said hinge is secured between said collar and said airbag housing.

6. The trim panel of claim 1, wherein said collar and said hinge are made of different materials.

7. The trim panel of claim 1, wherein the hinge is in the form of a sheet.

8. The trim panel of claim 7, wherein said hinge is attached to said door by a vibration weld.

9. The trim panel of claim 7, wherein said hinge covers substantially all of said door.

10. The trim panel of claim 7, wherein said hinge includes a scrim.

11. The trim panel of claim 10, wherein said scrim is embedded within said sheet.

12. The trim panel of claim 1, wherein said tear seam has a substantially rectangular shape.

13. An interior vehicle trim panel comprising:
a panel body having a tear seam to allow an airbag to exit said panel body when the airbag is deployed, said tear seam defining a door;
a hinge connected to said airbag door and said panel body;
a collar attached to said panel body and at least partially surrounding said tear seam, said collar being separate from said panel body and said hinge, said collar having a first face attached to said panel body and an opposed second face; and
an airbag housing attached to said second face of said collar, wherein a portion of said hinge is secured between said collar and said airbag housing.

14. The trim panel of claim 13, wherein the hinge is in the form of a sheet.

15. The trim panel of claim 14, wherein scrim is embedded within said sheet.

16. An interior vehicle trim panel comprising:
a panel body having a tear seam to allow an airbag to exit said panel body when the airbag is deployed, said tear seam defining a door;
a hinge connected to said airbag door and said panel body; and
a collar welded to said panel body and surrounding said tear seam, said collar separate from said panel body and said hinge, said collar including a plurality of outwardly extending weld beads welded to said panel body, said plurality of weld beads extending continuously around said tear seam and concentrically arranged relative to one another.

17. The trim panel of claim 16 further including an airbag housing attached to said collar, wherein a portion of said hinge is secured between said collar and said airbag housing.

18. The trim panel of claim 16, wherein said collar and said hinge are made of different materials.

19. The trim panel of claim 16, wherein the hinge is in the form of a sheet.

20. The trim panel of claim 19, wherein said hinge includes a scrim embedded within said sheet.

* * * * *